(12) United States Patent
Balepin

(10) Patent No.: US 6,227,486 B1
(45) Date of Patent: May 8, 2001

(54) PROPULSION SYSTEM FOR EARTH TO ORBIT VEHICLE

(75) Inventor: Vladimir Balepin, Butte, MT (US)

(73) Assignee: MSE Technology Applications, INC., Butte, MT (US)

( * ) Notice: Subject to any disclaimer, the term of this patent is extended or adjusted under 35 U.S.C. 154(b) by 0 days.

(21) Appl. No.: 09/322,050

(22) Filed: May 28, 1999

(51) Int. Cl.[7] .................................................. F02M 67/00
(52) U.S. Cl. .......................... 244/73 R; 244/74; 244/172; 60/224; 60/226
(58) Field of Search .................................. 244/172, 53 R, 244/73 R, 2; 60/224, 246, 260, 263, 266, 270.1, 39.15, 39.21

(56) References Cited

U.S. PATENT DOCUMENTS

| | | | |
|---|---|---|---|
| 2,531,761 | * 11/1950 | Zucrow | 244/172 |
| 2,679,726 | * 6/1954 | Moncrieff | 244/172 |
| 3,103,102 | * 9/1963 | Sargent et al. | 244/73 R |
| 3,149,461 | * 9/1964 | Eichholtz | 244/73 R |
| 3,261,571 | * 7/1966 | Pinnes | 244/172 |
| 3,285,175 | * 11/1966 | Keenan | 244/73 R |
| 3,756,024 | * 9/1973 | Gay | 244/172 |
| 5,012,640 | * 5/1991 | Mirville | 60/246 |
| 5,740,985 | * 4/1998 | Scott et al. | 244/2 |

OTHER PUBLICATIONS

Salkeld, "Mixed–Mode Propuslion for the Space Shuttle" Astronautics and Aeronautics,, pp 52–58, Aug. 1971.*
Scott, Space Acess launch System Based on Airbreathing Ejector Ramjet: Aviation Week and Space Tech, pp 75–77, Mar. 30, 1998.*

* cited by examiner

Primary Examiner—Galen L. Barefoot
(74) Attorney, Agent, or Firm—Peter Tribulski

(57) ABSTRACT

A single-stage earth-to-orbit launch vehicle employs a combination of rocket engines and turbojet engines to propel a device into orbit. The vehicle is driven through a unique set of operating conditions of the engines to conserve oxidizer and optimize acceleration. Cooling effects of fuel used by both types of engines is employed to maintain operating temperature of the turbojet engines within limits of lightweight materials. The rocket engines are used during initial acceleration and then permitted to remain deeply throttled or idle until the vehicle reaches a speed of about Mach 6. The rocket engine, with most of its oxidizer intact, is then used to accelerate the vehicle into orbit.

15 Claims, 3 Drawing Sheets

FIG. 2

| SPEED | 0 TO MACH 0.8 | MACH 0.8 TO MACH 1.5 | MACH 1.5 TO MACH 6.0 | MACH 6.0 TO ORBIT VELOCITY |
|---|---|---|---|---|
| PRE-COOLING | ROCKET FUEL + TURBOJET FUEL | ROCKET FUEL + TURBOJET FUEL | TURBOJET FUEL AND POSSIBLY FRACTION OF ROCKET FUEL | NONE |
| ENGINE OPERATION | ROCKET + TURBOJET + $O_2$ | ROCKET + TURBOJET | PRINCIPALLY TURBOJET + THROTTLED ROCKET | ROCKET ONLY |

PROPULSION SYSTEM FOR EARTH TO ORBIT VEHICLE

FIELD OF THE INVENTION

The invention relates to engines and propulsion techniques for earth-to orbit vehicles.

BACKGROUND OF THE INVENTION

As vehicles are propelled into earth orbit, their propulsion systems require engines which are driven with self contained oxidizers, i. e. rocket engines. Rocket engines are required for a number of reasons.

First of all, a vehicle entering earth orbit must be accelerated even after the vehicle leaves the atmosphere of the earth. Thus an engine driving such a vehicle must have a self-contained source of oxygen to facilitate combustion of its fuel.

Secondly, there is a need to provide a very high thrust to weight ratio for the vehicle in order to facilitate vertical liftoff and rapid acceleration. Rocket engines are well suited to this task.

However, a rocket propelled vehicle must have a large portion of its initial or take-off mass dedicated to fuel and on-board oxidizer. In other words, rocket engines have very low specific impulse, i.e., a low ratio of thrust to mass of on board oxidizer and fuel. A consequence of this inherently low specific impulse is that earth to orbit vehicles must be propelled into orbit using multiple stage rockets. Heretofore, there has been no practical way to propel a vehicle into earth orbit with a single stage launch vehicle. This need to use multiple stage rockets has, of course, precluded development of a reusable launch vehicle for earth orbit devices.

Development efforts have been directed to achieving a practical reusable launch vehicle for earth orbit devices. A number of prior art proposals have been made to utilize an air breathing engine to produce some of the needed thrust for an earth to orbit vehicle while the vehicle is still in the earth's atmosphere.

These prior art efforts have encountered one common difficulty. Turbojet engines are inherently heavy when compared to rocket engines. In other words, turbojet engines have a much lower thrust to weight ratio than rocket engines. As a result of this inherent feature of conventional turbojet engines, it is difficult to enhance payload performance of a launch vehicle by adding a turbojet engine to the vehicle. In many cases, the added weight of the turbojet engine exceeds any payload advantage which would result from reduction of weight derived from reducing on-board oxidizer.

There have been some prior art efforts directed to increasing the thrust to weight ratio of turbojet engines. Engines which operate with cryogenic fuels such as liquid hydrogen have been developed. These cryogenic engines utilize incoming-air pre-cooling as a mechanism to avoid overheating of engine components. If engine components can be operated at reduced temperature, they can be fabricated from relatively light alloys. Thus, a turbojet engine with effective pre-cooling can become an engine with an improved thrust to weight ratio.

In prior art turbojet engines, this pre-cooling is produced by a heat exchanger which employs the cooling effect of liquid hydrogen fuel as it passes from its on-board storage to a combustion chamber on the vehicle. While this system is somewhat effective in improving thrust-to-weight ratio, it does not improve this ratio sufficiently to add significantly to the payload performance of a launch vehicle. Some examples of these proposals are found in U.S. Pat. No. 5,101,622 (Bond) and an article entitled "Air Precooling for Aerospace Engine: Soviet Style", A. Rudakov and V. Balepin, Aerospace Engineering, Aug. 1991, pp.29–30, (Ref. 2).

Other efforts have been made in the prior art to improve the thrust to weight ratio. Additional cooling is provided by overfueling the engine. The pre-cooled turbojet engine is driven with more hydrogen than is needed for stoichiometric operation. This passes more hydrogen through the pre-cooling system which produces greater cooling. This provides for somewhat higher thrust capability with light weight alloy engine components. But, this technique is subject to the rule of diminishing returns. Increased thrust is derived from use of excessive hydrogen. Excessive hydrogen use has its payload costs. More hydrogen must be put on board the vehicle and its storage tanks must be larger. Consequently, there is very little net improvement in thrust to weight ratio when the excess hydrogen cooling technique is employed.

Most of the prior art development efforts aimed at achieving a practical re-usable earth to orbit launch vehicle have focused on the use of air-breathing engines to augment rocket engines. These developments efforts have heretofore been frustrated because of the difficulties presented by the inherently low thrust to weight ratios of turbojet engines.

It is a goal of the present invention therefore to provide a practical propulsion system for re-usable earth to orbit vehicle which utilizes an air breathing engine combined with a rocket engine.

It is a further goal of the present invention to provide such a propulsion system by employing a unique set of operating techniques for combined turbojet and rocket engines.

SUMMARY OF THE INVENTION

The present invention is directed to a method of propelling a vehicle into earth orbit. The method comprises the steps of initiating acceleration of the vehicle with thrust provided from a combination of an air breathing engine and a rocket engine. Incoming air of the air breathing engine is cooled with fuel flow to both the air breathing engine and the rocket engine. The rocket engine is throttled when the vehicle reaches a first velocity. The vehicle is then accelerated to a second velocity using the turbojet engine as the principal source of thrust. The rocket engine is then returned to full operation to accelerate the vehicle to a third velocity sufficient to propel the vehicle into earth orbit.

Viewed from another aspect, the present invention is directed to an apparatus for conveying an optimum payload into earth orbit. The apparatus comprises a vehicle equipped with at least one turbojet engine and at least one rocket engine. Each of the engines is adapted to operate through oxidation of the same type of combustible fuel. The turbojet has an incoming-air cooling means which utilizes fuel flowing to both engines for cooling. The turbojet and rocket engines are adapted to operate simultaneously to produce take-off of the vehicle and to accelerate the vehicle to a first velocity. The turbojet is adapted to provide the principal source of thrust to accelerate the vehicle from the first velocity to a second velocity. The rocket engine is adapted to operate independently to accelerate the vehicle from the second velocity to a third velocity which is sufficient to place the vehicle into earth orbit.

Viewed for still another point of view, the present invention is directed to a low-mass apparatus for accelerating a vehicle. The apparatus comprises a rocket engine and a turbojet engine with a lightweight incoming-air cooler and lightweight engine components. The turbojet engine and the rocket engine are adapted to operate with the same type of combustible fuel. The incoming air cooler is adapted to utilize fuel flow to both of the engines whereby operating temperature of the turbojet is maintained below a critical temperature limit for the lightweight engine components.

The invention will be better understood from the following detailed description taken in consideration with the accompanying drawings and claims.

BRIEF DESCRIPTION OF THE DRAWINGS

FIG. 2 is a table showing an interrelationship of vehicle speed, engine operating conditions and pre-cooling in accordance with one embodiment of the present invention;

The drawings are not necessarily to scale.

DETAILED DESCRIPTION

Figure 1:
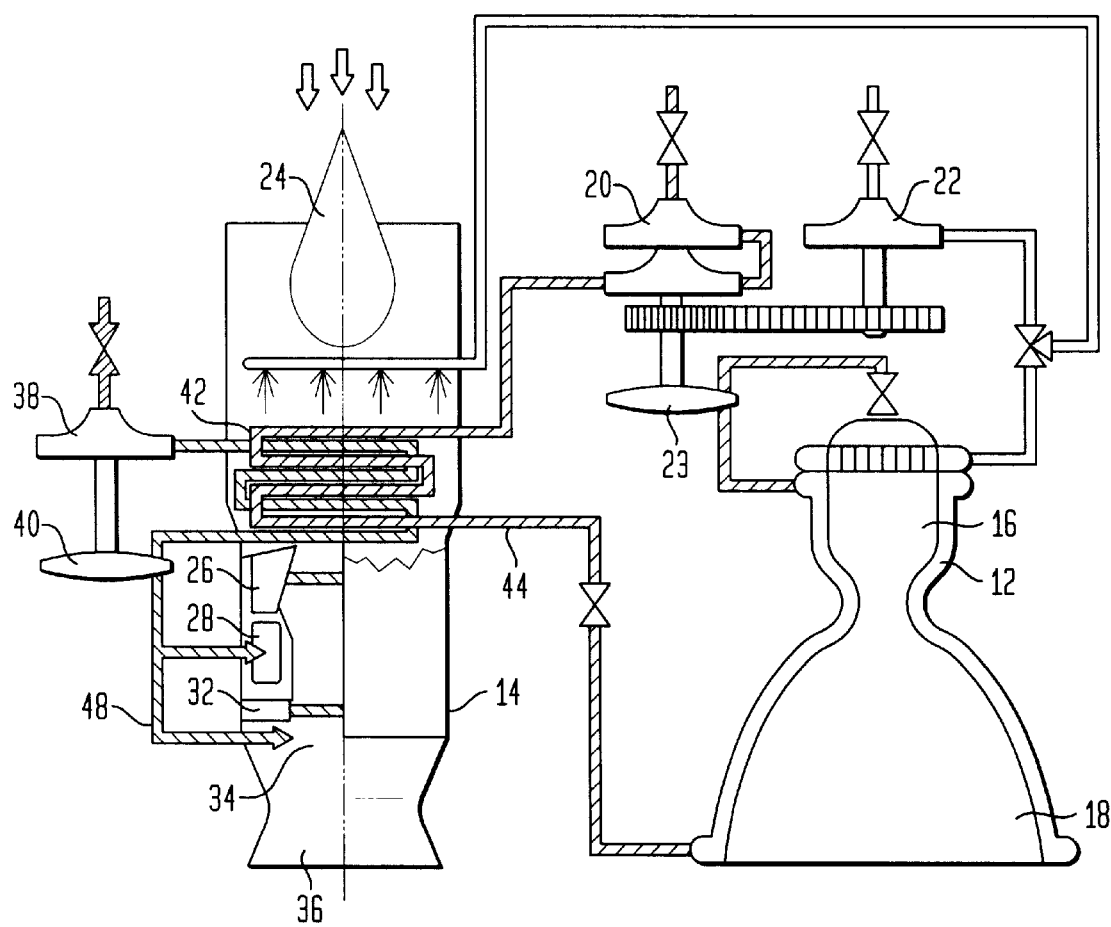
FIG. 1 is a cross-sectional view of a propulsion unit constructed in accordance with the present invention.

Referring now to FIG. 1, there is shown a schematic cross-sectional view of a propulsion unit 10 which is constructed and adapted to operate in accordance with the present invention. The propulsion unit 10 comprises a rocket engine 12 and a turbojet engine 14. The rocket engine 12 has a combustor 16, a nozzle 18, a liquid rocket fuel turbopump 20, an oxidizer turbopump 22 and a driver 23 for the turbopumps. The turbojet engine 14 has an air inlet 24, a compressor 26, a combustor 28, a turbine 32, an afterburner 34, an exhaust nozzle 36 and a turbojet fuel pump 38 and a driver 40 for the pump 38. The air inlet 24 of the engine 12 is provided with an air-cooling heat exchanger 42.

The engines 12 and 14 are adapted to burn the same type of fuel. In one practical arrangement, the engines 12 and 14 are adapted to burn hydrogen. Each of the engines 12 and 14 is supplied with hydrogen from supply tanks (not shown) of liquid hydrogen which are carried on the vehicle which the engines propel. The rocket engine 12 is supplied with its hydrogen fuel through piping designated by the numeral 44. The turbojet engine 14 is supplied with its hydrogen fuel through piping designated by the numeral 46. It can be seen that both sets of the piping 44 and 46 pass through the heat exchanger 42.

This arrangement facilitates extraordinary cooling of incoming air passing through the heat exchanger 42. This extraordinary cooling allows for operation of the engine 14 with a very high thrust-to-weight ratio. The components of the engine 14 are constructed of light weight materials and they must be operated at relatively low temperatures. Therefore it is important that thrust increasing techniques applied to the engine 14 do not produce intolerable increases in engine temperature. This critical control feature is provided by the extraordinary cooling effect of using fuel from both the rocket engine 12 and the turbojet engine 14 to provide for cooling of the incoming air. This joint operation of both engines achieves a unique increase in the thrust-to-weight ratio of the turbojet engine 14.

In prior art turbojet engines, cooling is performed by passing only the fuel for the turbojet engine through a heat exchanger as the fuel is consumed by the engine. In some versions of prior art turbojet engines, fuel is passed through the heat exchanger at a rate greater than that needed for stoichiometric operation of the engine. This practice produces very thorough cooling of incoming air, but it results in a very poor fuel efficiency. Neither of these prior art cooling techniques provides the requisite increase in vehicle thrust-to-weight ratio needed for operation of the present invention.

It must be recognized that a plurality of the propulsion units 10 are employed to propel a vehicle into earth orbit. The exact number of propulsion units 10 and their respective thrust capacities is a function of the payload weight which is being carried into orbit. For purposes of simplicity, the following discussion describes the propulsion unit 10 operating as only a single unit.

Referring now to FIG. 2, there is shown some graphical representations which help to illustrate how the unique structure of the inventive propulsion unit 10 is employed to propel an earth-to-orbit vehicle in accordance with one embodiment of the present invention.

A table 58 illustrates a relationship between engine operating conditions and pre-cooling conditions for various stages of activity of the vehicle. Along a row 60, speed of the vehicle is shown. Along a row 62, engine operation is shown. Along a row 64, a source of pre-cooling is shown.

As the vehicle lifts off from the earth, the turbojet engine 14 and the rocket engine 12 of FIG. 1 are activated. Additionally some of the oxygen from the rocket engine 12 is shunted to the air inlet 24 of the turbojet engine 14. Oxygen introduced to the turbojet incoming air produces two beneficial effects. First, the thrust of the turbojet engine 14 increases. Secondly, the oxygen helps to cool the incoming air so that moisture in the air will not produce icing on the heat exchanger 42.

Hydrogen fuel being consumed by both of these engines passes through the heat exchanger 42. This arrangement allows the turbojet engine 14 to be driven with a uniquely high thrust to weight ratio. The engine 14 is thus powered with a mixture of hydrogen and oxygen-rich air which produces extraordinary thrust. Flow of hydrogen to both of the engines 12 and 14 produces extraordinary cooling of the intake air. Thus, even though the engine 14 is fueled with this oxygen-enriched mixture, the operating temperature of its engine components is maintained at a level consistent with the use of light weight alloys for these components.

The vehicle is rapidly accelerated to a speed of about Mach 0.8 in this mode. Because the turbojet engine is operated with an unusually high thrust to weight ratio, this acceleration is accomplished with a relatively small portion of on-board fuel and oxidizer of the vehicle After the vehicle reaches a speed of Mach 0.8, the flow of oxygen to the turbojet engine 14 is stopped. The vehicle is about 4 Km. above the earth's surface and atmospheric moisture is low enough so that heat exchanger icing is not a problem. The engine 14 continues to operate, but only with atmospheric oxygen. Because some of the initial mass of on-board fuel and oxidizer have been consumed at this point, the vehicle can be accelerated to a speed of about Mach 1.5 with a reduced amount of thrust from the turbojet engine 14.

As the vehicle reaches Mach 1.5, the rocket engine 12 is shut down or deeply throttled. In this example, rocket shut down is a particular case of deep throttling. The actual degree of throttling that optimizes vehicle operation is a function of the exact combinations of engine types employed to propel the vehicle.

During initial acceleration, the orientation of the vehicle changes from vertical to horizontal. As the vehicle takes on a horizontal orientation, aerodynamic lift develops. This lift force produces a useful vertical force component which enhances the upward acceleration of the vehicle when the thrust to weight ratio of the vehicle is less than unity after the vehicle reaches Mach 1.5. At this stage, the vehicle is moving rapidly through the atmosphere, and the lift force is substantial. Consequently, rapid acceleration can continue to a speed of about Mach 6 with thrust delivered only by the turbojet engine 14.

Throughout interatmospheric acceleration from Mach 1.5 to Mach 6, the rocket engine 12 is idle. This, of course, means that none of the rocket engine fuel or oxidizer is consumed during this period of acceleration. Consequently, the vehicle reaches a velocity of about Mach 6 with its on-board rocket propellants largely intact and ready for use. At this point further turbojet operation is not beneficial.

This is the speed and location in which a prior-art, multi-stage rocket system would be when its first stage would probably jettison. However, in the system of the present invention, the rocket engine 12 is restarted and the vehicle is accelerated into orbit velocity. The turbojet engine 14, because it is such a lightweight engine, can be successfully carried along with the vehicle into orbit.

When the vehicle returns to earth, it is intact and re-usable, because no component of the vehicle is jettisoned during the earth-to-orbit launch.

Illustrative Embodiment with Specific Example

An illustrative embodiment of the present invention shows some of the unique flexibility that can be employed to optimize vehicle performance.

A small "university class" payload of about 150 Kg. can be delivered to low earth orbit with a reusable launch vehicle constructed and operated in accordance with the present invention in the following manner.

A launch vehicle having a gross take-off weight of 67 tons is required. Small liquid rocket engines of the Pratt & Whitney RL10 family are employed. These rocket engines can be adapted to have a sea level thrust capability of 11 tons each. Turbojet engines are employed to provide approximately 62% of the required sea-level trust. Each turbojet engine provides about 9 tons of sea-level thrust. The combination of engines required for this task is four rocket engines and six turbojet engines. One of the rocket engines is not employed at sea level launch for reasons which are explained later hereinbelow. The combined thrust of these engines at sea level is 87 tons, which corresponds to a thrust-to-weight ratio of about 1.3.

At initial lift-off, there is simultaneous operation of all of the turbojet engines and three of the rocket engines.

Oxygen is injected into incoming air of the turbojet engines at a rate that is about 5–10% of the mass of the incoming air. The oxygen produces higher thrust for the turbojet engines and also acts to reduce incoming air temperature below the water triple point to prevent precooler icing. Hydrogen fuel for both the rocket engines and the turbojet engines flows through air pre-coolers of the turbojet engines. During initial acceleration, thrust is very high but specific impulse is low.

Figure 3:
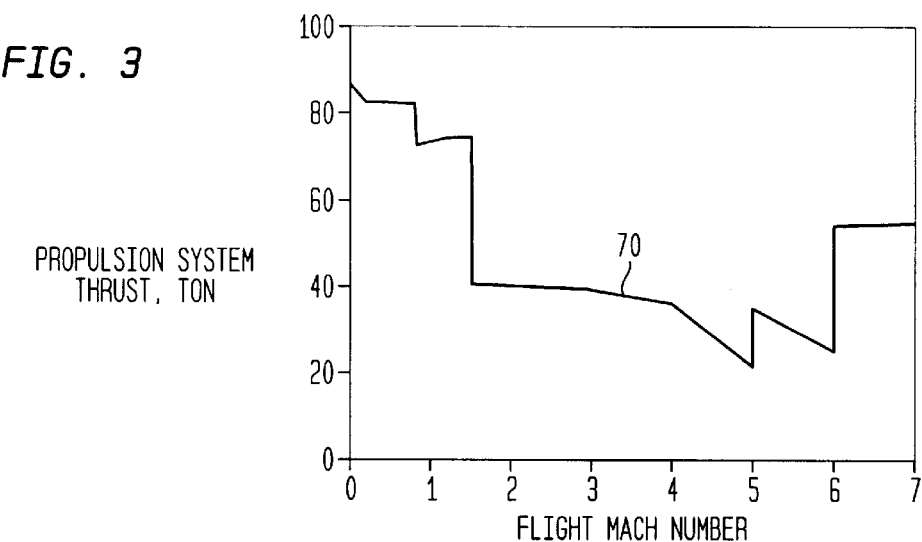
FIG. 3 is a graph comparing vehicle speed and propulsion system thrust when one embodiment of the present invention is practiced.
Figure 4:
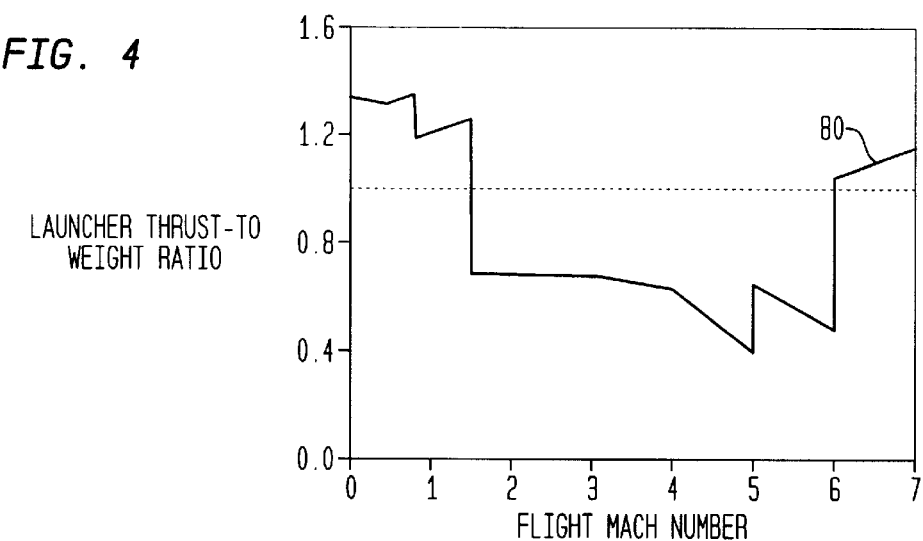
FIG. 4 is a graph comparing vehicle speed and thrust-to-weight ratio when one embodiment of the present invention is practiced.
Figure 5:
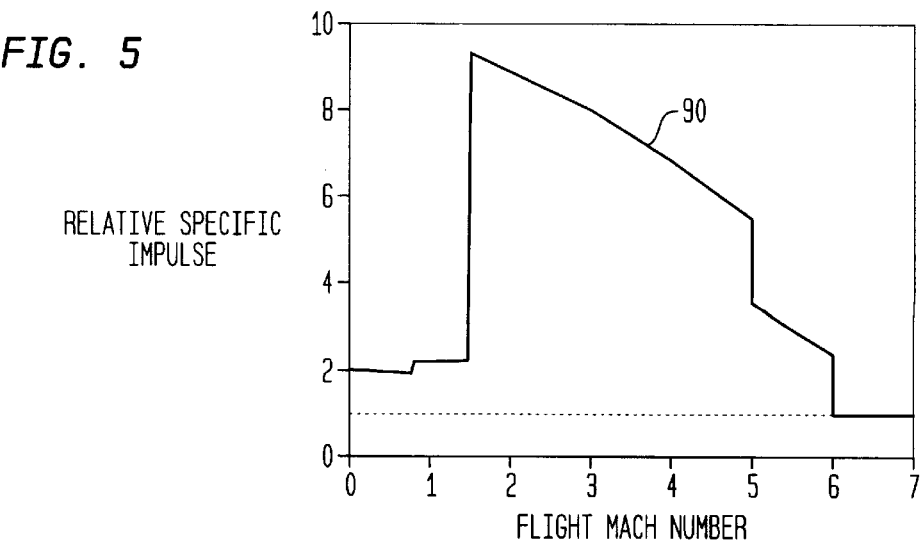
FIG. 5 is a graph comparing vehicle speed and relative specific impulse when one embodiment of the present invention is practiced.

Referring now to FIGS. 3, 4 and 5 one can see a collection of interrelated parameters associated with this particular implementation of the present invention during a launch of an earth-to-orbit vehicle. FIG. 3 shows a relationship between propulsion system thrust and vehicle speed along a graph line designated generally by the numeral 70. FIG. 4 shows a relationship between vehicle thrust-to-weight ratio along a graph line designated generally by the numeral 80. FIG. 5 shows a relationship between relative specific impulse and vehicle speed along a graph line designated generally by the numeral 90.

During initial acceleration in the range of Mach 0–0.8, thrust slightly decreases from an initial level of 87 tons to about 82 tons. Vehicle thrust-to-weight ratio remains close to the take off level of 1.3. The specific impulse of the combined propulsion system at this time is only 155–170% of the specific impulse of typical liquid rocket engines, i.e. the relative specific impulse is about 1.55–1.7.

At Mach 0.8, the vehicle reaches an altitude of about 4 Km where atmospheric moisture is insignificant. Oxygen injection in front of the precooler is cut off. After this oxygen injection is stopped, the relative specific impulse of the propulsion system increases to about 1.8–1.9. This relative specific impulse remains nearly constant up to a speed of about Mach 1.5 even though thrust in this speed range decreases to about 72–74 tons. Nevertheless, thrust remains high enough to provide vehicle thrust-to-weight ratio above unity (1.17–1.24) which is sufficient to accelerate the vehicle through a tough transonic regime (Mach 0.9–1.3) to Mach 1.5.

At Mach 1.5 the rocket engines are throttled. Thrust of the propulsion system decreases to about 41 tons. This produces a relative specific impulse of about 9.3. The vehicle thrust-to-weight ratio drops to 0.68.

After the rocket engines are throttled, hydrogen flow through the precoolers is reduced and cooling of incoming air is diminished. To partially compensate for this diminished cooling, the turbojet engines may operate in an over-fueled mode. This causes a reduction in the relative specific impulse but maintains a suitably high thrust to continue the required acceleration.

As acceleration continues to about Mach 4, thrust and relative specific impulse decrease because of increasing air inlet momentum and features of various turbojet component interactions. After Mach 4, air inlet restrictions cause deterioration of the turbojet thrust. At this point atmospheric drag on the vehicle begins to approach the level of available thrust and the continued acceleration of the vehicle is jeopardized.

At about Mach 5, one of the rocket engines is turned on to produce an additional 11–13 tons of thrust. This, of course, reduces relative specific impulse from 5.5 to about 3.6, but acceleration occurs more rapidly.

As the vehicle approaches Mach 6, more of the rocket engines are started and the some of the turbojet engines are shut down. This form of engine operation permits grater hydrogen flow into the precoolers of the remaining operating turbojet engines. As a result, the remaining turbojet engines operate more efficiently and relative specific impulse is optimized.

As the vehicle accelerates past Mach 6, the propulsion is provided completely by the rocket engines. At this point, the vehicle weight is about 80% of its initial gross take-off weight or 53.6 tons. Further acceleration of the vehicle requires a thrust-to-weight ratio greater than unity. This means that the three operating rocket engines are not sufficient to provide the needed thrust. The fourth spare engine is activated at this time . When all four of the rocket engine are operated at 105% of their nominal thrust their combined thrust output is 53.6 tons. In this mode the vehicle is accelerated into earth orbit.

It is to be appreciated and understood that the specific embodiments of the invention are merely illustrative of the general principles of the invention. Various modifications may be made by those skilled in the art which are consistent with the principles set forth. Various combinations of turbojet and rocket engines can be used to practice the invention. Similarly various combinations of engine activation at particular speeds can be performed, all within the scope of the present invention.

What is claimed is:

1. A method for propelling a vehicle into earth orbit which comprises the steps of:
   initiating acceleration of the vehicle with thrust provided from a combination of a turbojet engine and a rocket engine; and
   cooling incoming air of the turbojet engine with fuel flow to both the turbojet engine and the rocket engine.

2. A method for propelling a vehicle into earth orbit which comprises the steps of:
   initiating acceleration of the vehicle with thrust provided from a combination of a turbojet engine and a rocket engine;
   cooling incoming air of the turbojet engine with fuel flow to both the turbojet engine and the rocket engine;
   throttling the rocket engine when the vehicle reaches a first velocity;
   accelerating the vehicle to a second velocity with the turbojet engine providing the principal source of thrust; and
   returning the rocket engine to full operation to accelerate the vehicle to a third velocity.

3. The method of claim 2 wherein the step of throttling the rocket engine is performed by shutting off the engine.

4. The method of claim 2 which comprises the further step of orienting the vehicle to provide for aerodynamic lift while accelerating the vehicle to the second velocity.

5. The method of claim 2 wherein the first velocity is at least about Mach 0.8.

6. The method of claim 2 wherein the second velocity is at least about Mach 5.

7. The method of claim 2 wherein the third velocity is sufficient to maintain the vehicle in earth orbit.

8. The method of claim 2 which comprises the further step of:
   injecting vehicle-borne oxygen into incoming air of the air breathing engine during acceleration to the first velocity.

9. A low-mass apparatus for accelerating a vehicle which comprises:
   a turbojet engine with lightweight components and an incoming-air cooler;
   a rocket engine;
   the turbojet engine and the rocket engine being adapted to operate with the same type of combustible fuel; and
   the incoming air cooling being adapted to utilize fuel flow to both of the engines;
   whereby operating temperature of the turbojet engine is maintained below a critical temperature limit for light weight components.

10. The apparatus of claim 9 which further comprises:
    means to introduce vehicle-borne oxygen into the incoming air to increase thrust production of the turbojet engine.

11. Apparatus for conveying an optimum payload into earth orbit which comprises:
    a vehicle equipped with at least one turbojet engine and at least one rocket engine;
    each of the engines being adapted to operate through oxidation of the same type of combustible fuel;
    the turbojet having an incoming-air cooling means; the turbojet and rocket engines being adapted to
    operate simultaneously to produce vertical take-off of the vehicle and to accelerate the vehicle to a first velocity;
    the turbojet engine being adapted to provide the principal source of thrust to accelerate the vehicle from the first velocity to a second velocity; and
    the rocket engine being adapted to operate independently to accelerate the vehicle from the second velocity to a third velocity.

12. The apparatus of claim 11 wherein:
    the vehicle is shaped to produce aerodynamic lift thereon when propelled through air; and
    the turbojet is adapted to operate independently of the rocket engine to accelerate the vehicle from the first velocity to the second velocity while the vehicle is subjected to aerodynamic lift.

13. A method for propelling a vehicle into earth orbit which comprises the steps of:
    initiating acceleration of the vehicle with thrust provided from a combination of turbojet engines and rocket engines to produce a vehicle thrust-to-weight ratio greater than unity;
    cooling incoming air of the turbojet engines with fuel flow to both the turbojet engines and the rocket engines;
    injecting oxygen into the incoming air of the turbojet engines until the vehicle reaches an altitude of about 4 Km;
    decreasing the thrust-to-weight ratio of the vehicle to less than unity after the vehicle reaches a first velocity;
    accelerating the vehicle at the reduced thrust-to-weight ratio until the vehicle reaches a second velocity;
    increasing the thrust-to-weight ratio to exceed unity after the second velocity is reached; and
    accelerating the vehicle so that it enters earth orbit.

14. The method of claim 13 wherein the first velocity is at least about Mach 1.2.

15. The method of claim 13 wherein the second velocity is at least about Mach 5.

* * * * *